(12) United States Patent
Lee et al.

(10) Patent No.: US 11,774,957 B2
(45) Date of Patent: Oct. 3, 2023

(54) METHOD OF OPERATING REMOTE CONTROLLER, COMPUTER PROGRAM, AND REMOTE CONTROLLER

(71) Applicant: HANWHA AEROSPACE CO., LTD., Changwon-si (KR)

(72) Inventors: Yun Su Lee, Changwon-si (KR); Chul Hee Han, Changwon-si (KR); Seung Woo Jeon, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 256 days.

(21) Appl. No.: 16/853,866

(22) Filed: Apr. 21, 2020

(65) Prior Publication Data
US 2021/0200203 A1 Jul. 1, 2021

(30) Foreign Application Priority Data
Dec. 30, 2019 (KR) .................. 10-2019-0178511

(51) Int. Cl.
*G05D 1/00* (2006.01)
*H04W 4/40* (2018.01)
*G05D 1/12* (2006.01)

(52) U.S. Cl.
CPC ......... *G05D 1/0016* (2013.01); *G05D 1/0022* (2013.01); *G05D 1/0027* (2013.01); *G05D 1/0094* (2013.01); *G05D 1/12* (2013.01); *H04W 4/40* (2018.02); *G05D 2201/0209* (2013.01)

(58) Field of Classification Search
CPC ......... G05D 1/0027; G05D 2201/0213; G05D 1/0088; G05D 1/0011; B64C 39/024; B64C 2201/146; B25J 13/089
See application file for complete search history.

(56) References Cited

U.S. PATENT DOCUMENTS

| | | | |
|---|---|---|---|
| 8,313,379 B2 * | 11/2012 | Ikeda | A63F 13/98 345/158 |
| 9,724,601 B2 * | 8/2017 | Fujita | A63F 13/213 |
| 10,155,587 B1 * | 12/2018 | Tang | B64D 47/02 |

(Continued)

FOREIGN PATENT DOCUMENTS

| | | | | |
|---|---|---|---|---|
| JP | H0744516 B2 * | 5/1995 | | G06F 13/00 |
| KR | 10-2011-0024086 A | 3/2011 | | |

(Continued)

OTHER PUBLICATIONS

Sogawa Takayuki, Data Communication Method Between On-Vehicle Computers, May 1995 (Year: 1995).*

*Primary Examiner* — Yuen Wong
*Assistant Examiner* — Carville Albert Hollingsworth, IV
(74) *Attorney, Agent, or Firm* — Sughrue Mion, PLLC

(57) ABSTRACT

A method of operating a remote controller for controlling one or more vehicles that are remotely controllable includes performing communication connection between a main controller of the remote controller and each of the one or more vehicles, the main controller including at least one processor; checking setting information of one or more secondary controllers connected to the main controller; and transmitting an input obtained by each of the one or more secondary controllers to a respective at least one vehicle of the one or more vehicles by referring to the setting information.

16 Claims, 8 Drawing Sheets

(56) References Cited

U.S. PATENT DOCUMENTS

| | | | | |
|---|---|---|---|---|
| 2016/0075355 A1* | 3/2016 | Kellner | ................ | B61L 25/028 |
| | | | | 701/2 |
| 2016/0305745 A1* | 10/2016 | Peebles | ................ | G08G 5/0047 |
| 2017/0364068 A1* | 12/2017 | Harada | .................. | B64D 45/00 |
| 2018/0373240 A1* | 12/2018 | Kim | ....................... | G05D 1/104 |

FOREIGN PATENT DOCUMENTS

| KR | 10-1439214 B1 | 9/2014 |
|---|---|---|
| KR | 10-1760740 B1 | 7/2017 |
| KR | 10-1893865 B1 | 8/2018 |

\* cited by examiner

METHOD OF OPERATING REMOTE
CONTROLLER, COMPUTER PROGRAM,
AND REMOTE CONTROLLER

CROSS-REFERENCE TO THE RELATED
APPLICATION

This application is based on and claims priority from Korean Patent Application No. 10-2019-0178511, filed on Dec. 30, 2019, in the Korean Intellectual Property Office, the disclosure of which is incorporated herein in its entirety by reference.

BACKGROUND

1. Field

Apparatus and methods consistent with embodiments of the present disclosure relate to a remote controller for controlling one or more vehicles that are remotely controllable.

2. Description of Related Art

With the great development of science and technology since the Industrial Revolution, there have been major changes in weapons used in wars or methods of using the weapons. The biggest goal of such technological development is to guarantee the safety of people who strike the enemy by directly operating various machines or weapons.

In general, the most commonly used weapons wars are guns and cannons. Guns and cannons are directly carried by humans, or are remotely used by being mounted on vehicles such as armored vehicles or patrol boats.

As the number of vehicles or firearms mounted on the vehicles increases, the number of users who operate the vehicles or the firearms has to increase as well, and thus, it is difficult to efficiently use weapon systems.

SUMMARY

An aspect of the present disclosure is to enable a weapon system to be efficiently used.

Another aspect of embodiments of the present disclosure is to enable one user to control multiple vehicles by using one remote controller or to control multiple functions of a single vehicle by using one remote controller.

Still another aspect of embodiments of the present disclosure is to enable a plurality of functions to be controlled by using one remote controller according to the attachment/detachment of a secondary controller for controlling multiple functions to/from the remote controller.

Additional aspects will be set forth in part in the description which follows and, in part, will be apparent from the description, or may be learned by practice of the presented embodiments of the disclosure.

According to one or more embodiments, a method of operating a remote controller for controlling one or more vehicles that are remotely controllable includes: performing communication connection between a main controller of the remote controller and each of the one or more vehicles, the main controller including at least one processor; checking setting information of one or more secondary controllers connected to the main controller; and transmitting an input obtained by each of the one or more secondary controllers to a respective at least one vehicle of the one or more vehicles, by referring to the setting information.

According to an embodiment, the checking of the setting information includes: identifying an operation target vehicle of each of the one or more secondary controllers; and identifying, for each of the one or more secondary controllers, an operation target function of the identified operation target vehicle of the secondary controller.

According to an embodiment, the setting information includes identification information of an operation target vehicle and identification information of an operation target function, and the checking of the setting information includes detecting the one or more secondary controllers connected to the main controller.

According to an embodiment the one or more secondary controllers include a first controller and a second controller, the checking of the setting information includes determining whether the setting information of the first controller and the setting information of the second controller indicate a same operation target vehicle and a same operation target function, and the method further includes, in a case where it is determined that the same operation target vehicle and the same operation target function are indicated: displaying an interface for modifying at least one from among the setting information of the first controller and the setting information of the second controller, and modifying the at least one from among the setting information of the first controller and the setting information of the second controller based on a user input.

According to an embodiment, the checking of the setting information includes: determining whether the identification information of the operation target vehicle and the identification information of the operation target function are assigned to a first controller of the one or more secondary controllers, displaying, in a case where at least one from among the operation target vehicle and the identification information of the operation target function are not assigned to the first controller, an interface for setting, as the setting information of the first controller, the at least one from among the identification information of the operation target vehicle and the identification information of the operation target function, and setting, based on a user input, the setting information of the first controller to include the at least one from among the identification information of the operation target vehicle and the identification information of the operation target function.

According to an embodiment the one or more vehicles include a vehicle provided with a firearm capable of shooting, the setting information of a first controller of the one or more secondary controllers includes identification information of the vehicle and identification information of an operation target function of the vehicle and the operation target function includes at least one of a driving function, a shooting function, and a monitoring function.

According to an embodiment, the method further includes, after the checking of the setting information, modifying the setting information of a first controller of the one or more secondary controllers based on an input of a user.

According to an embodiment, the setting information for the first controller includes identification information of an operation target vehicle and identification information of an operation target function of the operation target vehicle, the modifying of the setting information includes modifying the identification information of the operation target vehicle, from a first vehicle to a second vehicle of the one or more vehicles, and the identification information of the operation target function, from a first function to a second function, and the transmitting includes transmitting the input obtained by the first controller to the second vehicle that is the operation target vehicle, by referring to the setting information including the modified identification information of the operation target vehicle.

According to an embodiment, the first controller is configured to set a shooting, function of the operation target vehicle indicated in the setting information of the first controller, wherein the transmitting includes transmitting information about a set shooting target to the second vehicle, that is the operation target vehicle after the modifying, according to the input obtained by the first controller.

According to an embodiment, the setting information for the first controller includes identification information of an operation target vehicle and identification information of an operation target function of the operation target vehicle, and the modifying of the setting information includes modifying the identification information of the operation target vehicle, from a first vehicle to a second vehicle of the one or more vehicles, or modifying the identification information of the operation target function, from a first function to a second function.

According to one or more embodiments, a computer program stored in a non-transitory computer readable medium is provided. The computer program is configured to, when executed by at least one processor: perform communication connection between a main controller of a remote controller and each of one or more vehicles, the main controller including the at east one processor; check setting information of one or more secondary controllers connected to the main controller; and transmit an input obtained by each of the one or more secondary controllers to a respective at least one vehicle of the one or more vehicles by referring to the setting information.

According to one or more embodiments, remote controller for controlling one or more vehicles that are remotely controllable includes: a main controller including at least one processor, the main controller configured to transmit data to and receive data from each of the one or more vehicles; and one or more secondary controllers configured to transmit data to and receive data from the main controller, obtain one or more inputs of a user, and transmit the one or more inputs to the main controller, wherein the main controller is further configured to check setting information of each of the one or more secondary controllers and transmit an input obtained by each of the one or more secondary controllers to a respective at least one vehicle of the one or more vehicles by referring to the checked setting information.

According to an embodiment the main controller is further configured to: identify an operation target vehicle of each of the one or more secondary controllers, and identify, for each of the one or more secondary controllers, an operation target function of the identified operation target vehicle of the secondary controller.

According to an embodiment the setting information for each of the one or more secondary controllers includes identification information of an operation target vehicle and identification information of an operation target function, and the main controller is further configured to detect the one or more secondary controllers connected to the main controller, when checking the setting information.

According to an embodiment the one or more secondary controllers include a first controller and a second controller, the one or more secondary controllers include a first controller and a second controller, the main controller is further configured to, in a case where the main controller determines that the same operation target vehicle and the same operation target function are indicated: display an interface for modifying at least one from among the setting information of the first controller and the setting information of the second controller, and modify the at least one from among the setting information of the first controller and the setting information of the second controller based on a user input.

In an embodiment, the main controller is further configured to: determine whether the identification information of the operation target vehicle and the identification information of the operation target function are assigned to a first controller of the one or more secondary controllers, display, in a case where at least one from among the operation target vehicle and the identification information of the operation target function are not assigned to the first controller, an interface for setting, of the setting information of the first controller, the at least one from among the identification information of the operation target vehicle and the identification information of the operation target function, and set, based on a user input, the setting information of the first controller to include the at least one from among the identification information of the operation target vehicle and the identification information of the operation target function.

In an embodiment, the one or more vehicles include a vehicle provided with a firearm capable of shooting, the setting information of a first controller of the one or more secondary controllers includes identification information of the vehicle and identification information of an operation target function of the vehicle, and the operation target function includes at least one of a driving function, a shooting function, and a monitoring function.

In an embodiment, the main controller is further configured to modify the setting information of a first controller of the one or more secondary controllers based on an input of the user.

In an embodiment, the setting information for the first controller includes identification information of an operation target vehicle and identification information of an operation target function of the operation target vehicle, and the main controller is further configured to: modify the identification information of the operation target vehicle, from a first vehicle to a second vehicle of the one or more vehicles, and the identification information of the operation target function, from a first function to a second function, and transmit the input obtained by the first controller to the second vehicle that is the operation target vehicle, by referring to the setting information including the modified identification information of the operation target vehicle.

In an embodiment, the first controller is configured to set a shooting function of the operation target vehicle indicated in the setting information of the first controller, and the main controller is further configured to transmit information about a set shooting target to the second vehicle, that is the operation target vehicle after the modifying, according to the input obtained by the first controller.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
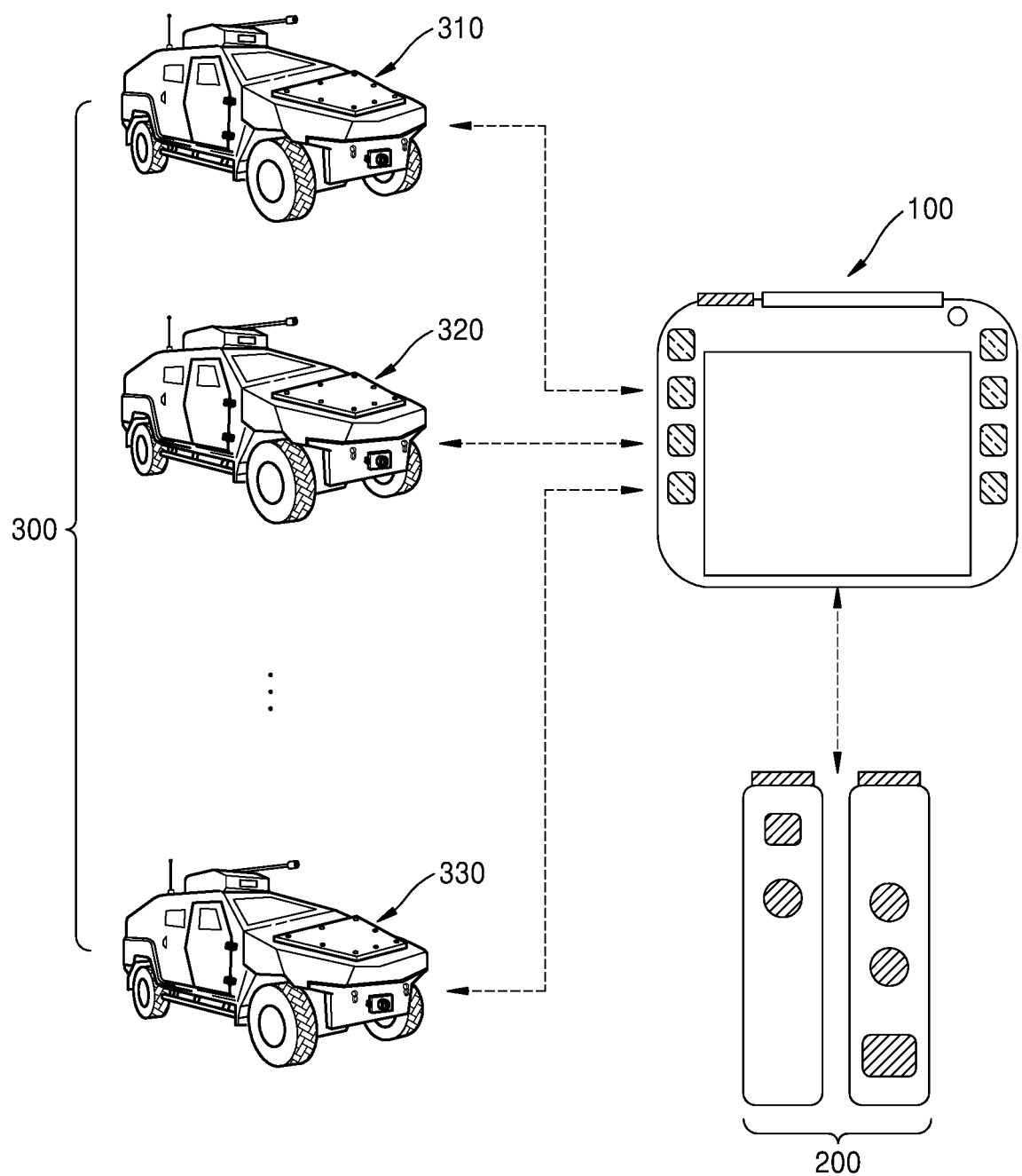
FIG. 1 is a view illustrating a configuration of a vehicle remote control system according to an embodiment of the present disclosure.

Embodiments described herein are all non-limiting examples, and thus, the present disclosure is not limited to the embodiments described below and may be realized in various other forms. Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first," "second," etc. may be used herein to describe various elements, these elements should not be limited by these terms. These terms are only used to distinguish one element from another. As used herein, the singular forms "an," and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements may be exaggerated for convenience of explanation. In other words, because sizes and shapes of elements in the drawings are arbitrarily illustrated for convenience of explanation, the following embodiments are not limited thereto.

FIG. 1 is a view illustrating a configuration of a vehicle remote control system according to an embodiment of the present disclosure.

The vehicle remote control system according to an embodiment of the present disclosure may include a main controller 100, one or more secondary controllers 200, and one or more vehicles 300.

In embodiments, the one or more vehicles 300 may be various mechanical devices that are remotely controllable. For example, the one or more vehicles 300 may be armored cars provided with firearms capable of shooting as shown in FIG. 1, or may be flying devices provided with wings or rotors. Alternatively, the one or more vehicles 300 may be mechanical devices such as ships or submarines moving in water or under water. However, this is merely an example, and the scope of the present disclosure is not limited thereto.

The one or more vehicles 300 according to an embodiment of the present disclosure may be implemented to perform one or more operable functions. For example, when the one or more vehicles 300 are armored cars as shown in FIG. 1 the one or more vehicles 300 may be implemented to perform functions such as a driving function, a shooting function, and a monitoring function. However, the functions are merely examples, and the scope of the present disclosure is not limited thereto.

The one or more vehicles 300 according to an embodiment of the present disclosure may be a plurality of vehicles. For example, when the one or more vehicles 300 may include three armored cars (e.g., first through third vehicles 310, 320, and 330) as shown in FIG. 1.

In an embodiment of the present disclosure, the one or more vehicles 300 may include only the same type of vehicles, or may include different types of vehicles. For example, when the one or more vehicles 300 may include only a plurality of armored cars, or may include a plurality of armored cars and a plurality of drones (or flying objects). However, this is merely an example, and the scope of the present disclosure is not limited thereto.

The main controller 100 according to an embodiment of the present disclosure may be a device that transmits a control signal to the one or more vehicles 300 according to an operation input(s) by a user to the main controller 100 and/or the one or more secondary controllers 200. That is, the main controller 100 may be a device for remotely controlling the one or more vehicles 300.

In the present disclosure, the main controller 100 and/or the one or more secondary controllers 200 may be referred to as a 'remote controller' sometimes. Accordingly, the remote controller may include the main controller 100, or may include a combination of the main controller 100 and the one or more secondary controllers 200.

Figure 2:
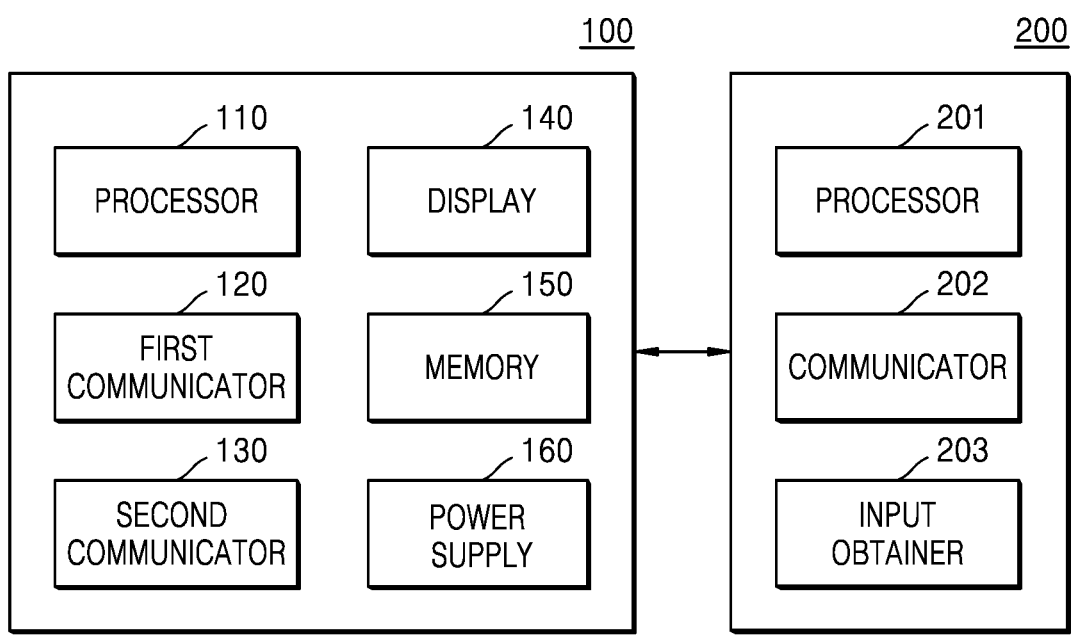
FIG. 2 is a view illustrating a configuration of a remote controller according to an embodiment of the present disclosure.

FIG. 2 is a view illustrating a configuration of a remote controller according to an embodiment of the present disclosure.

The main controller 100 according to an embodiment of the present disclosure may include a processor 110, a first communicator 120, a second communicator 130, a display 140, a memory 150 and a power supply 160 to respectively perform various functions described herein. According to an embodiment, the main controller 100 may include at least one processor, corresponding to the processor 110, to perform at least part of the various functions.

The processor 110 according to an embodiment of the present disclosure may be any type of hardware and/or software for processing data. The processor 110 may be a data processing device embedded in hardware and having a circuit that is physically structured to execute, for example, code or a command in a program.

Examples of the data processing device embedded in hardware may include, but are not limited to, a microprocessor, a central processing unit (CPU), a processor core, a multiprocessor, an application-specific integrated circuit (ASIC), and a field-programmable gate array (FPGA).

The first communicator 120 according to an embodiment of the present disclosure may be a means through which the processor 110 transmits/receives data to/from the one or more vehicles 300. For example, when the main controller 100 and the one or more vehicles 300 are connected to each other through wireless communication using a predetermined frequency band, the first communicator 120 may be a modem or a communication chip for transmitting/receiving data in the predetermined frequency band. However, this is merely an example, and the scope of the present disclosure is not limited thereto.

The second communicator 130 according to an embodiment of the present disclosure may be a means through which the processor 110 transmits data to and receives data from the one or more secondary controllers 200. For example, when the main controller 100 and the one or more secondary controllers 200 transmit/receive data through physical connection, the second communicator 130 may be hardware and software for allowing data to be transmitted/received through a communication line that connects the main controller 100 to the one or more secondary controllers 200.

When the main controller 100 and the one or more secondary controllers 200 are wirelessly connected to each other, the second communicator 130 may be hardware and software for allowing data to be transmitted/received through wireless connection of the main controller 100 and the one, or more secondary controllers 200.

The display 140 according to an embodiment of the present disclosure may be a means for displaying content needed to control the one or more vehicles 300. For example, when a secondary controller that controls a shooting function of the one or more vehicles 300 is connected to the main controller 100, the display 140 may display an interface that sets a shooting target. However, this is merely an example and the scope of the present disclosure is not limited thereto, and the display 140 may display various screens under the control of the processor 110.

The memory 150 according to an embodiment of the present disclosure temporarily or permanently stores data processed by the processor 110, instructions, a program, program code, or a combination thereof. The memory 150 may include, but is not limited to, a magnetic storage medium or a flash storage medium.

The power supply 160 according to an embodiment of the present disclosure may be a means for supplying power to the main controller 100 and/or the one or more secondary controllers 200. The power supply 160 may include, but is not limited to, a battery pack including one or more battery cells.

The one or more secondary controllers 200 according to an embodiment of the present disclosure may include a processor 201, a communicator 202, and an input obtainer 203 to perform various functions described herein. According to an embodiment, the one or more secondary controllers 200 may include at least one processor, corresponding to the processor 201, to perform at least part of the various functions The processor 201 according to an embodiment of the present disclosure may transmit an input of the user, obtained by the input obtainer 203, to the main controller 100. The processor 201 may have a same or similar configuration as described above with respect to the processor 110 of the main controller 100.

The communicator 202 according to an embodiment of the present disclosure may transmit data to and receive data from the second communicator 130 of the main controller 100. For example, the communicator 202 may transmit an input of the user, obtained by the input obtainer 203, to the communicator 130. Also, the communicator 202 may transmit setting information of the one or more secondary controllers 200 to the main controller 100, according to a setting information request of the main controller 100. The communicator 202 may have a same or similar configuration as described above with respect to the second communicator 130 of the main controller 100.

The input obtainer 203 according to an embodiment of the present disclosure may be a means for generating an electrical signal corresponding to an operation input of the user. The input obtainer 203 may be configured to vary according to which function corresponds to the one or more secondary controllers 200. For example, when a certain secondary controller is a secondary controller for a driving function of the one or more vehicles 300 the input obtainer 203 may be configured to obtain a steering input of the user, an acceleration input of the user, and a deceleration input of the user. In embodiment, the input obtainer 203 may include one or more sensors.

Also, when a certain secondary controller, of the one or more secondary controllers 200, is for a shooting function of the one or more vehicles 300, the input obtainer 203 of the certain secondary controller may be configured to obtain an input for setting a shooting target and an input for selecting a shooting weapon. However, the configuration is merely an example, and the scope of the present disclosure is not limited thereto.

Figure 3:
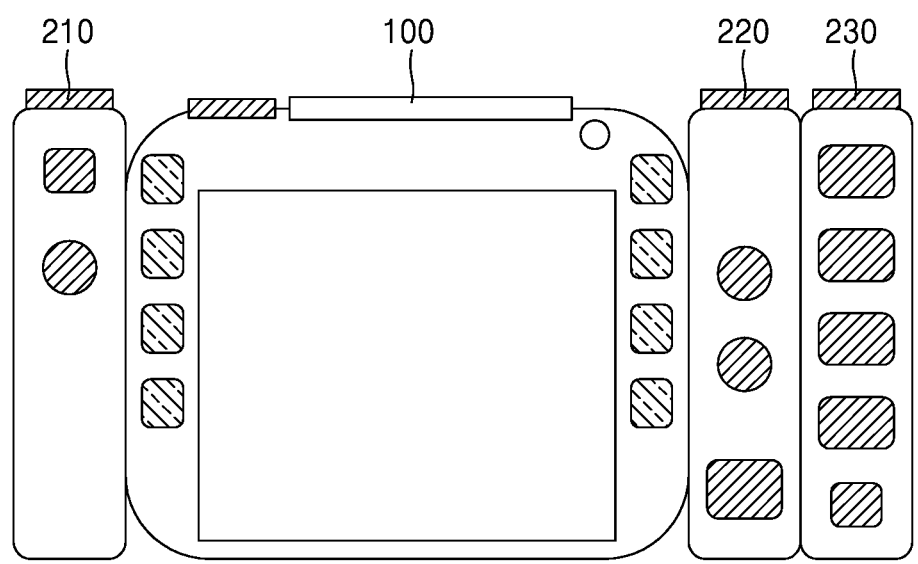
FIG. 3 is a view illustrating a main controller and secondary controllers according to an embodiment of the present disclosure.

FIG. 3 is a view illustrating a configuration of a remote controller according to an embodiment of the present disclosure.

In an embodiment of the present disclosure, the main controller 100 and secondary controllers 210, 220, and 230 may be used by being connected physically (or by wire) as shown in FIG. 3.

For example, the user may connect the main controller 100 and the secondary controllers 210, 220, and 230 through a connection port (not shown) provided on side surfaces of the main controller 100 and the secondary controllers 210, 220, and 230. When a plurality of secondary controllers are connected, some secondary controllers (e.g., the secondary controllers 220 and 230) may be connected to the main controller 100 by being stacked on a side surface of the main controller 100.

A method of operating the remote controller, performed by the processor 110 of the main controller 100, will be described.

The processor 110 according to an embodiment of the present disclosure may perform communication connection between the main controller 100 and each of the one or more vehicles 300.

When 'communication connection is performed', it may mean that a data transmission/reception path for transmitting receiving data between two devices is generated and the generated data transmission/reception path is temporarily or permanently maintained.

The communication connection may be performed by the user's manipulation of the main controller 100. For example, when communication connection between the main controller 100 and the first vehicle 310 is made, the main controller 100 may display, on the display 140, identification information of the first vehicle 310 that is in a connectable state, and may perform communication connection with the first vehicle 310 according to an input of the user that selects the identification information. In this case, the main controller 100 may store information about the communication connection in the memory 150 along with the identification information of the first vehicle 310. In an embodiment, manipulation of the main controller 100 may be performed by a user providing an input by touching a touch screen of the display 140 or interacting with any other input device (e.g. a button or switch) of the main controller 100, while the touch screen displays one or more interfaces of the display 140.

Communication connection may be automatically performed. For example, it is assumed that communication connection between the main controller 100 and the first vehicle 310 was made once at some point in the past and information about the communication connection at that time is stored in the memory 150. In this case, the main controller 100 may perform communication connection with the first vehicle 310 even with no input of the user.

The processor 110 according to an embodiment of the present disclosure may check setting information of the one or more secondary controllers 200 connected to the main controller 100.

In an embodiment of the present disclosure, when the one or more secondary controllers 200 are connected to the main controller 100, the processor 110 may check the setting information of the one or more secondary controllers 200 by obtaining an input of the user through an interface displayed on the display 140 (e.g. obtaining an input via a touch screen of the display 140). In this case, the setting information of the one or more secondary controllers 200 may not be preset for each individual secondary controller, but may be set in the main controller 100 when the one or more secondary controllers 200 are connected to the main controller 100, which will be described below with reference to FIG. 4.

In one or more embodiments of the present disclosure, the processor 110 may check the setting information by receiving the setting information, which is set by a setting unit (see, e.g. FIG. 5) provided in each of the one or more secondary controllers 200, from the one or more secondary controllers 200, which will be described below with reference to FIG. 5.

Figure 4:
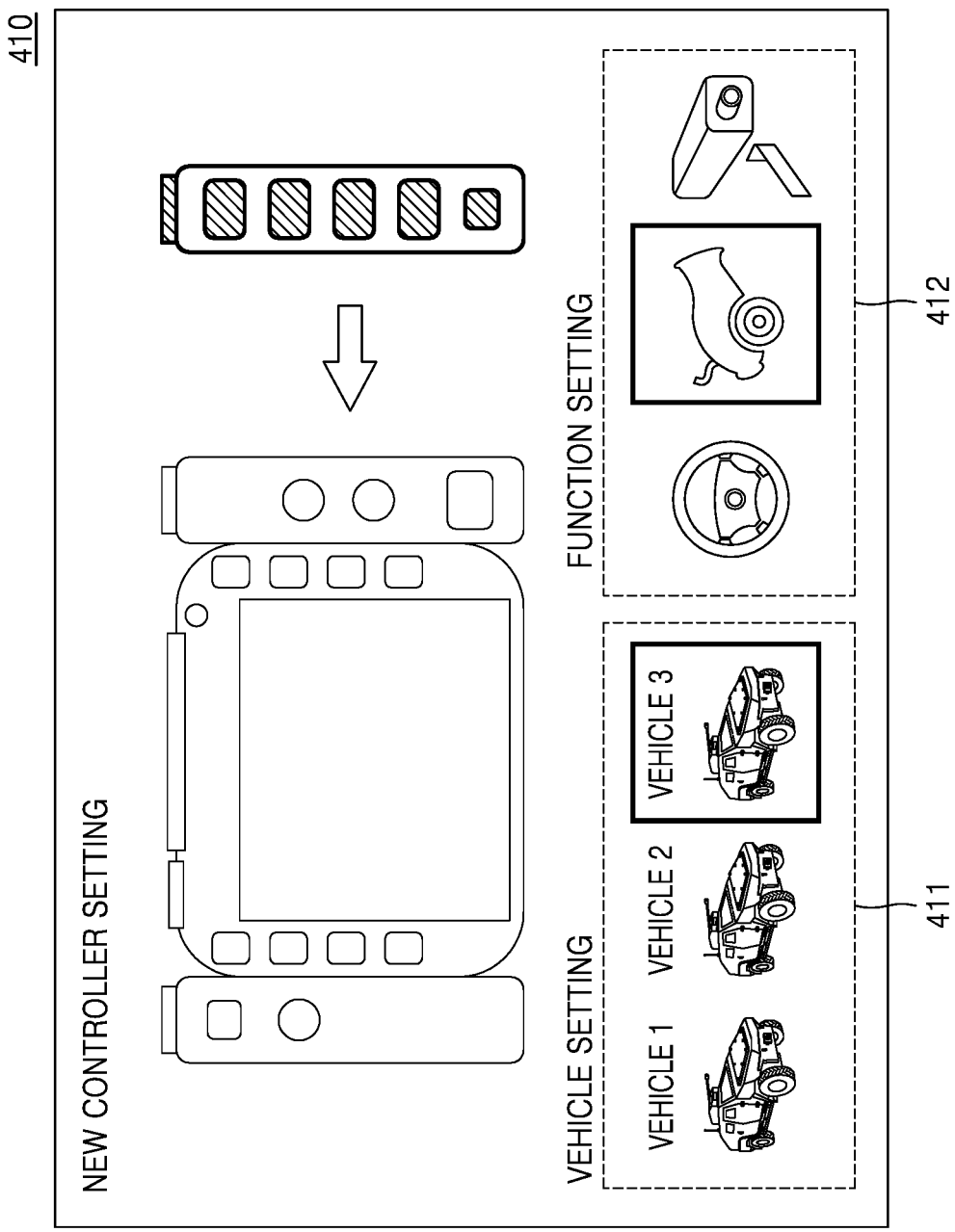
FIG. 4 is a view illustrating a screen displayed on a display when the secondary controller is connected to the main controller.

FIG. 4 is a view illustrating a screen 410 displayed on the display 140 when the secondary controller 230 (see FIG. 3) is connected to the main controller 100. For convenience of explanation, the secondary controller 230 (see FIG. 3) will be referred to as a newly connected secondary controller.

In an embodiment of the present disclosure, the processor 110 may detect the one or more secondary controllers 200 connected to the main controller 100. In more detail, the processor 110 may check whether there is a main controller to which at least one of identification information of an operation target vehicle and identification information of an operation target function is not assigned from among the one or more secondary controllers 200 whose connection is detected.

In an embodiment of the present disclosure, when the main controller to which at least one of the identification information of the operation target vehicle and the identification information of the operation target function is not assigned is found, the processor 110 may display a second interface for setting the main controller. For example, when the processor 110 detects connection of the newly connected secondary controller 230 (see FIG. 3), the processor 110 may display the screen 410 for setting the newly connected secondary controller 230 (see FIG. 3).

In this case, the screen 410 may include an area 411 for setting the operation target vehicle and an area 412 for setting the operation target function. An animation showing that the newly connected secondary controller 230 (see FIG. 3) is connected to the main controller 100 may also be displayed on the screen 410, in addition to the two areas 411 and 412.

The user may set the operation target vehicle and the operation target function of the newly connected secondary controller 230 (see FIG. 3) by performing an input operation on the two areas 411 and 412, and thus the operation target vehicle and the operation target function of the newly connected secondary controller 230 (see FIG. 3) may be set (or checked).

Figure 5:
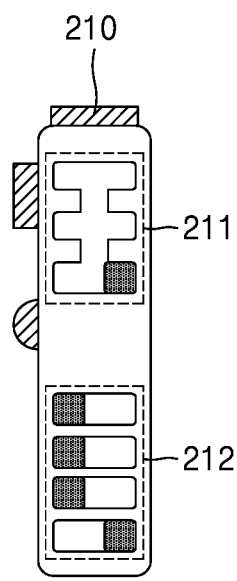
FIG. 5 is a view illustrating setting units provided in the secondary controller.

FIG. 5 is a view illustrating a function setting unit 211 and a vehicle setting unit 212 provided in the secondary controller 210.

In one or more embodiments of the present disclosure, the user may set an operation target vehicle and an operation target function of the secondary controller 210 by using the function setting unit 211 and the vehicle setting unit 212 provided in the secondary controller 210.

For example, the user may set the operation target function of the secondary controller 210 by moving a switch to one of six positions on the function setting unit 211. Likewise, the user may set the operation target vehicle of the secondary controller 210 by combining states of four toggle switches on the vehicle setting unit 212.

The processor 201 of the secondary controller 210 may obtain setting information of the function setting unit 211 and the vehicle setting unit 212 and may generate setting information of the secondary controller 210 based on the obtained setting information of the function setting unit 211 and the vehicle setting unit 212. The generated setting information of the secondary controller 210 may be transmitted to the main controller 100.

Any number of secondary controllers of the secondary controllers 200 may include a same or similar configuration as the secondary controller 210, such that secondary controllers include one or more setting units.

The processor 110 according to embodiments of the present disclosure may check the operation target vehicle and the operation target function of the secondary controller 210 (or any other secondary controllers of the one or more secondary controllers 200) from the setting information obtained from the secondary controller 210. Similarly, the processor 110 may check the operation target vehicle and the operation target function of other secondary controllers of the one or more secondary controllers 200.

The processor 110 according to an embodiment of the present disclosure may determine whether an operation target vehicle and an operation target function of a newly connected secondary controller and an operation target vehicle and an operation target function of an already detected (or connected) secondary controller overlap each other.

When the operation target vehicle and the operation target function of the newly connected secondary controller and the operation target vehicle and the operation target function of the already detected (or connected) secondary controller overlap each other, the processor 110 may display a first interface for setting the overlapping secondary controllers.

Figure 6:
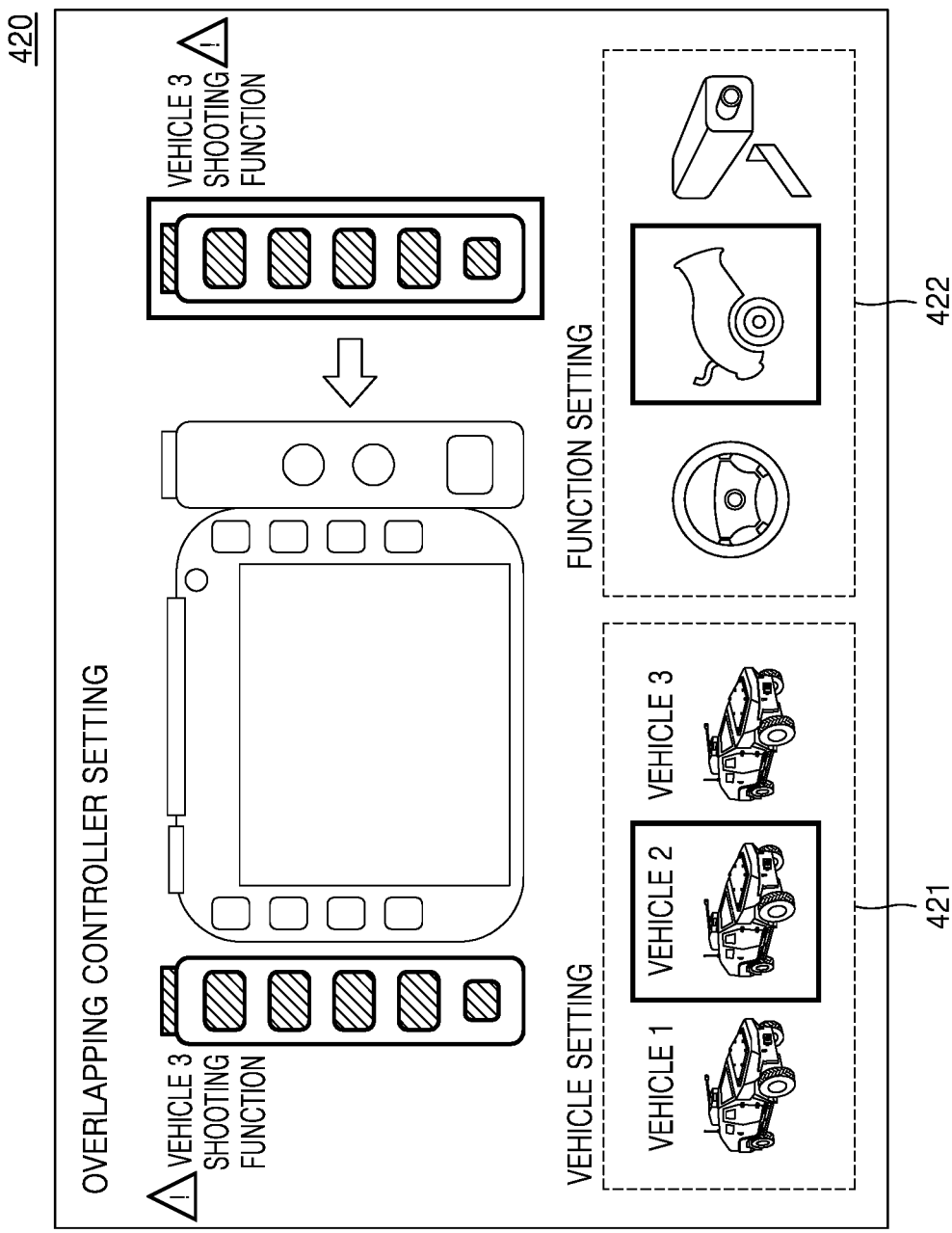
FIG. 6 is a view illustrating a screen on which a first interface displayed.

FIG. 6 is a view illustrating a screen 420 on which a first interface is displayed.

As shown in FIG. 6, the processor 110 may display, via the display 140, an image of overlapping secondary controllers to be distinguished from other secondary controllers and/or a main controller. Also, the processor 110 may enable the overlapping secondary controllers to be set through areas 421 and 422 in the screen 420.

For example, when an operation target vehicle and an operation target function of a leftmost secondary controller and a newly added secondary controller overlap each other as shown in FIG. 6, the processor 110 may obtain an input of the user that modifies a setting of one of the two secondary controllers through the areas 421 and 422.

The user may remove overlapping settings of the secondary controllers by selecting a secondary controller to be modified on the screen 420 and performing a modification input operation on the areas 421 and 422. In an embodiment, the user may select the secondary controller to be modified and perform the modification input operation by manipulating the main controller 100 (e.g. touching a touch screen of the display 140).

The processor 110 according to an embodiment of the present disclosure may modify setting information of a secondary controller based on an input of the user.

Figure 7:
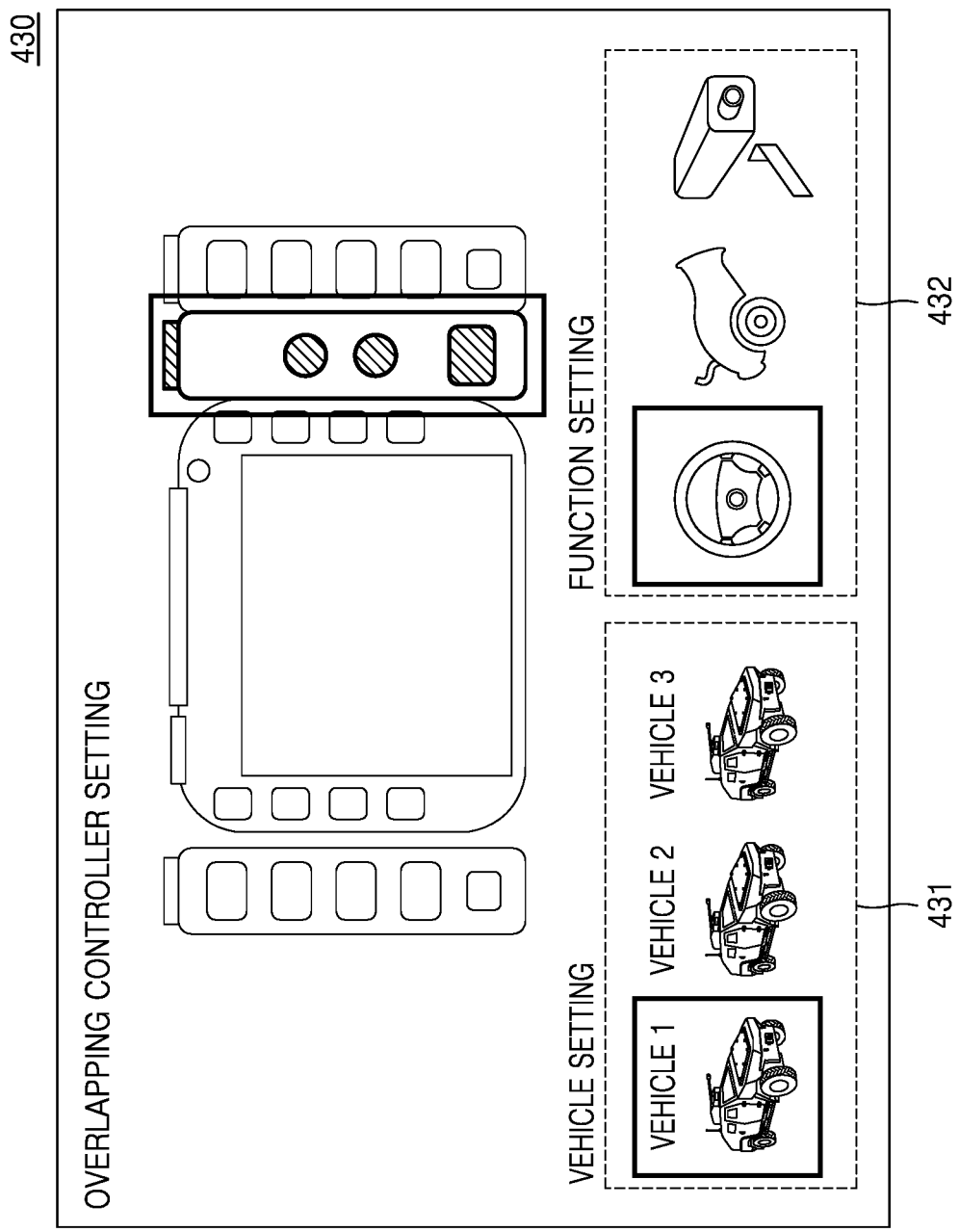
FIG. 7 is a view illustrating a screen on which setting information of an secondary controller is modified.

FIG. 7 is a view illustrating a screen 430 on which setting information of a secondary controller is modified.

The processor 110 according to an embodiment of the present disclosure may obtain an input of the user that selects a secondary controller whose setting information is to be modified and an input of the user related to a modification item and a modification value. For example, the user may select a main controller on the right side of the screen 430 and may modify an operation target vehicle of the main controller on the right side from a vehicle 2 to vehicle 1. The processor 110 may modify setting information of the main controller on the right side and may store the modified setting information.

The processor 110 according to an embodiment of the present disclosure may transmit an input obtained by the one or more secondary controllers 200 to the one or more vehicles 300, by referring to setting information of the one or more secondary controllers 200.

When setting information of a secondary controller is modified according to the above process, the processor 110 may transmit an input obtained by the secondary controller to the one or more vehicles 300 by referring to the modified setting information.

In an embodiment, the processor 110 may set a plurality of operation target vehicles of a specific secondary controller, according to an input of the user that sets a plurality of operation target vehicles.

For example, when a secondary controller, of the one or more secondary controllers 200, is for setting a shooting function and the user sets a plurality of operation target vehicles for the secondary controller, the processor 110 may transmit information about a shooting target to the set plurality of vehicles, according to a shooting target input to the secondary controller. In this case, the processor 110 may appropriately change the shooting target input and may transmit the shooting target input considering a position and a firearm of each vehicle.

Accordingly, a plurality of vehicles may be operated by a small number of users.

Figure 8:
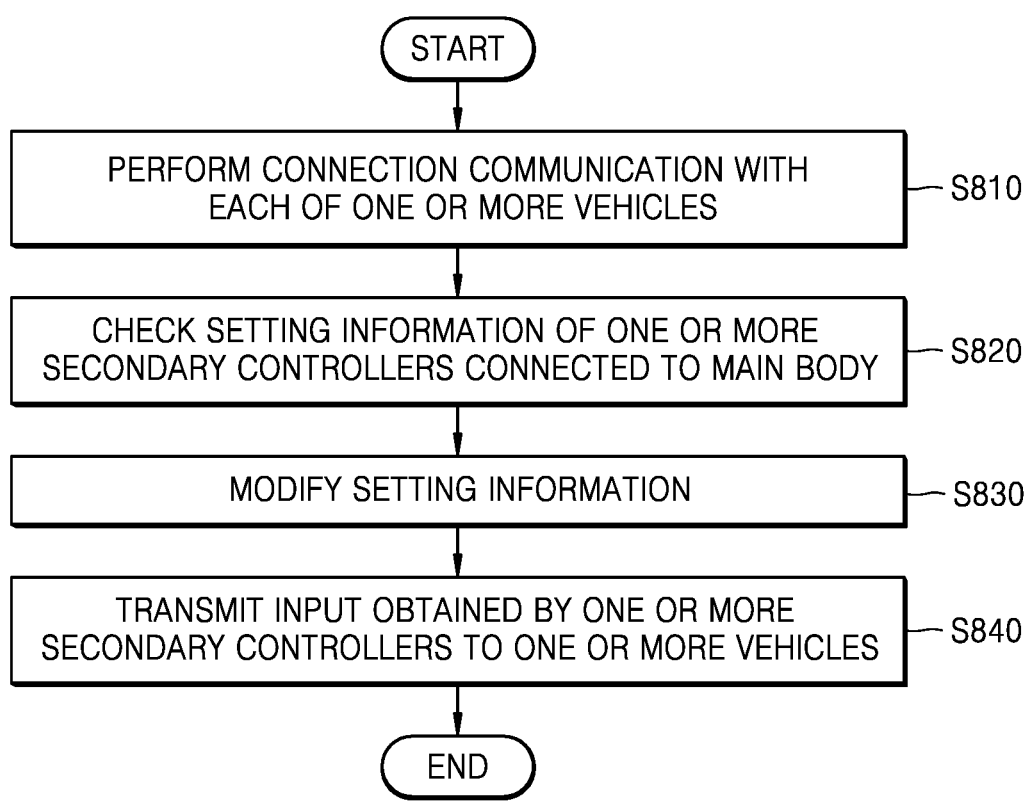
FIG. 8 is a flowchart for describing a method of operating a remote controller, performed by the main controller, according to an embodiment of the present disclosure.

FIG. 8 is a flowchart for describing a method of operating a remote controller, performed by the main controller 100, according to an embodiment of the present disclosure. The embodiment of FIG. 8 will be described with reference to FIGS. 1 through 7, while omitting some same descriptions that are made with reference to FIGS. 1 through 7.

In operation S810 the main controller 100 according to an embodiment of the present disclosure may perform communication connection between the main controller 100 and each of the one or more vehicles 300.

The communication connection may be performed by the user's manipulation of the main controller 100. For example, when communication connection between the main controller 100 and the first vehicle 310 is made, the main controller 100 may display, on the display 140, identification information of the first vehicle 310 that is in a connectable state, and may perform communication connection with the first vehicle 310 according to an input of the user that selects the identification information. In this case, the main controller 100 may store information about the communication connection in the memory 150 along with the identification information of the first vehicle 310.

Communication connection may be automatically performed. For example, it is assumed that communication connection between the main controller 100 and the first vehicle 310 was made once at some point in the past and information about the communication connection at that time is stored in the memory 150. In this case, the main controller 100 may perform communication connection with the first vehicle 310 even with no input of the user.

In operation S820, the main controller 100 according to an embodiment of the present disclosure may check setting information of the one or more secondary controllers 200 connected to the main controller 100.

In an embodiment of the present disclosure, when the one or more secondary controllers 200 are connected to the main controller 100, the main controller 100 may check the setting information of the one or more secondary controllers 200 by obtaining an input of the user through an interface displayed on the display 140 (e.g. obtaining an input via a touch screen of the display 140). In this case, the setting information of the one or more secondary controllers 200 may not be preset for each individual secondary controller, but may be set in the main controller 100 when the one or more secondary controllers 200 are connected to the main controller 100, as described above with reference to FIG. 4.

In one or more embodiments of the present disclosure, the main controller 100 may check the setting information by receiving the setting information, which is set by a setting unit provided in each of the one or more secondary controllers 200, from the one or more secondary controllers 200, as described above with reference to FIG. 5.

In an embodiment of the present disclosure, the main controller 100 may detect the one or more secondary controllers 200 connected to the main controller 100. In more detail, the main controller 100 may check whether there is a main controller to which at least one of identification information of an operation target vehicle and identification information of an operation target function is not assigned from among the one or more secondary controllers those connection is detected.

In an embodiment of the present disclosure, when the main controller to which at least one of the identification information of the operation target vehicle and the identification information of the operation target function is not assigned is found, a second interface for setting the main controller may be displayed. For example, when the main controller 100 detects connection of the newly connected secondary controller 230 (see FIG. 3), the main controller 100 may display the screen 410 for selling the newly connected secondary controller 230 (see FIG. 3).

In this case, the screen 410 may include the area 411 for setting the operation target vehicle and the area 412 for setting the operation target function. An animation showing that the newly connected secondary controller 230 (see FIG. 3) is connected to the main controller 100 may also be displayed on the screen 410, in addition to the two areas 411 and 412.

The user may set the operation target vehicle and the operation target function of the newly connected secondary controller 230 (see FIG. 3) by performing an input operation on the two areas 411 and 412, and thus, the operation target vehicle and the operation target function of the newly connected secondary controller 230 (see FIG. 3) may be set (or checked).

In one or more embodiments of the present disclosure the user may set an operation target vehicle and an operation target function of the secondary controller 210 by using the function setting unit 211 and the vehicle setting unit 212 provided in the secondary controller 210 (see FIG. 5).

For example, the user may set the operation target function of the secondary controller 210 by moving a switch to one of six positions on the function setting unit 211. Likewise, the user may set the operation target vehicle of the secondary controller 210 by combining states of four toggle switches on the vehicle setting unit 212.

The processor 201 of the secondary controller 210 may obtain setting information of the function setting unit 211 and the vehicle setting unit 212 and may generate setting information of the secondary controller 210 based on the obtained setting information of the function setting unit 211 and the vehicle setting unit 212. The generated setting information of the secondary controller 210 may be transmitted to the main controller 100.

The main controller 100 according to one or more embodiments of the present disclosure may check the operation target vehicle and the operation target function of the secondary controller 210 from the setting information obtained from the secondary controller 210. Similarly, the main controller 100 may check the operation target vehicle and the operation target function of other secondary controllers of the one or more secondary controllers 200 from the setting information obtained from such secondary controllers.

In operation S830, the main controller 100 according to an embodiment of the present disclosure may modify setting information of a secondary controller based on an input of the user.

For example, setting information of a controller may be modified using screen 430, which was described above with reference to FIG. 7.

The main controller 100 according to an embodiment of the present disclosure may obtain an input of the user that selects a secondary controller whose setting information is to be modified and an input of the user related to a modification item and a modification value. For example, the user may select a main controller on the right side of a screen and may modify an operation target vehicle of the main controller on the right side from a vehicle 2 to a vehicle 1. According to such modification, the main controller 100 may modify setting information of the main controller on the right side and may store the modified setting information.

The main controller 100 according to an embodiment of the present disclosure may determine whether an operation target vehicle and an operation target function of a newly connected secondary controller and an operation target vehicle and an operation target function of an already detected (or connected) secondary controller overlap each other.

When the operation target vehicle and the operation target function of the newly connected secondary controller and the operation target vehicle and the operation target function of the already detected (or connected) secondary controller overlap each other, the main controller 100 may display a first interface for setting the overlapping secondary controllers.

As shown in FIG. 6, the main controller 100 may display overlapping secondary controllers to be distinguished from other secondary controllers and/or a main controller. Also, the main controller 100 may enable the overlapping secondary controllers to be set through the areas 421 and 422 in the screen 420.

For example, when an operation target vehicle and an operation target function of a leftmost secondary controller and a newly added secondary controller overlap each other as shown in FIG. 6, the main controller 100 may obtain an input of the user that modifies a setting of one of the two secondary controllers through the areas 421 and 422.

The user may remove overlapping settings of the secondary controllers by selecting a secondary controller to be modified on the screen 420 and performing a modification input operation on the areas 421 and 422.

In operation S840, the main controller 100 according to an embodiment of the present disclosure may transmit an input obtained by the one or more secondary controllers 200 to the one or more vehicles 300, by referring to setting information of the one or more secondary controllers 200.

When setting information of a secondary controller is modified according to the above process, the main controller 100 may transmit an input obtained by the secondary controller to the one or more vehicles 300 by referring to the modified setting information.

In an embodiment, the main controller 100 may set a plurality of operation target vehicles of a specific secondary controller, according to an input of the user that sets a plurality of operation target vehicles.

For example, when a secondary controller is a secondary controller for setting a shooting function and the user sets a plurality of operation target vehicles for the secondary controller, the main controller 100 may transmit information about a shooting target to the set plurality of vehicles, according to a shooting target input to the secondary controller. In this case, the main controller 100 may appropriately change the shooting target input and may transmit the shooting target input considering a position and a firearm of each vehicle.

The embodiments of the present disclosure described above may be implemented as a computer program executable through various elements in a computer, and the computer program may be recorded on a computer-readable recording medium. Examples of the computer-readable recording medium include a magnetic medium such as a hard disk, a floppy disk, or magnetic tape, an optical medium such as a compact disk read-only memory (CD-ROM) or a digital versatile disk (DVD), a magneto-optical medium such as a floptical disk, and a hardware device specially configured to store and execute program instructions such as ROM, RAM, or a flash memory. Furthermore, examples of the computer-readable recording medium include tangible media that may be transmitted through a network, and for example, the computer-readable recording medium may be implemented as software or an application and may be transmitted and distributed through a network.

The computer program may be specially designed and constructed for the present disclosure or may be known to and usable by one of ordinary skill in the field of computer software. Examples of the computer program include high-level language code that may be executed by a computer using an interpreter as well as machine language code made by a compiler.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements, and it should be noted that many alternative or additional functional relationships, physical connections or logical connections may be present in a practical device. Moreover, no item or component is essential to the practice of the present disclosure unless the element is specifically described as "essential" or "critical".

According to the present disclosure, a weapon system may be efficiently used.

Also, according to the present disclosure, one user may control multiple vehicles by using one remote controller, or may control multiple functions of a single vehicle by using one remote controller.

Also, according to the present disclosure, a plurality of functions may be controlled by using one remote controller according to the attachment/detachment of a secondary controller for controlling multiple functions to/from the remote controller.

At least one of the components, elements, modules or units (collectively "components" in this paragraph) represented by a block in the drawings such as FIG. 2 may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of operating a remote controller for controlling one or more vehicles that are remotely controllable, the method comprising:
performing communication connection between a main controller of the remote controller and each of the one or more vehicles, the main controller comprising at least one processor;
checking, by the main controller, setting information of one or more secondary controllers of the remote controller that are physically attached to the main controller; and
transmitting, by the main controller, an input obtained by each of the one or more secondary controllers to a respective at least one vehicle of the one or more vehicles, by referring to, by the main controller, the setting information of the one or more secondary controllers,
wherein the setting information comprises identification information of an operation target vehicle and identification information of an operation target function of the operation target vehicle,
wherein the one or more secondary controllers include a first controller and a second controller,
wherein the checking of the setting information comprises determining, by the main controller, whether the setting information of the first controller and the setting information of the second controller indicate a same operation target vehicle and a same operation target function, and
wherein the method further comprises:
determining, by the main controller, that the same operation target vehicle and the same operation target function are indicated; and
based on the main controller determining that the same operation target vehicle and the same operation target function are indicated:
causing, by the main controller, a display to display an interface for modifying at least one from among the setting information of the first controller and the setting information of the second controller, and
modifying the at least one from among the setting information of the first controller and the setting information of the second controller based on a user input.

2. The method of claim 1, wherein the checking of the setting information comprises:
identifying, by the main controller based on the setting information, the operation target vehicle of each of the one or more secondary controllers that are physically attached to the main controller; and
identifying, by the main controller for each of the one or more secondary controllers based on the setting information, the operation target function of the identified operation target vehicle of at least one of the one or more secondary controllers that are physically attached to the main controller.

3. The method of claim 1, wherein
the checking of the setting information comprises detecting, by the main controller, the one or more secondary controllers physically attached to the main controller.

4. A method of operating a remote controller for controlling one or more vehicles that are remotely controllable, the method comprising:

performing communication connection between a main controller of the remote controller and each of the one or more vehicles, the main controller comprising at least one processor;

checking, by the main controller, setting information of one or more secondary controllers of the remote controller that are physically attached to the main controller; and transmitting, by the main controller, an input obtained by each of the one or more secondary controllers to a respective at least one vehicle of the one or more vehicles, by referring to, by the main controller, the setting information of the one or more secondary controllers, wherein the setting information comprises identification information of an operation target vehicle and identification information of an operation target function of the operation target vehicle, wherein the checking of the setting information comprises:

determining, by the main controller, that at least one from among the identification information of the operation target vehicle and the identification information of the operation target function is not assigned to a first controller of the one or more secondary controllers, causing, by the main controller and based on the main controller determining that the at least one from among the operation target vehicle and the identification information of the operation target function is not assigned to the first controller, a display to display an interface for setting, as the setting information of the first controller, the at least one from among the identification information of the operation target vehicle and the identification information of the operation target function, and setting, based on a user input, the setting information of the first controller to include the at least one from among the identification information of the operation target vehicle and the identification information of the operation target function.

5. The method of claim 1, wherein
the one or more vehicles comprise a vehicle provided with a firearm capable of shooting, and
the operation target function comprises at least one of a driving function, a shooting function, and a monitoring function.

6. The method of claim 1, wherein
the modifying of the setting information comprises modifying the identification information of the operation target vehicle, from a first vehicle to a second vehicle of the one or more vehicles, and the identification information of the operation target function, from a first function to a second function, and
the transmitting comprises transmitting the input obtained by the first controller to the second vehicle that is the operation target vehicle, by referring to the setting information comprising the modified identification information of the operation target vehicle.

7. The method of claim 6, wherein the first controller is configured to set a shooting function of the operation target vehicle indicated in the setting information of the first controller,
wherein the transmitting comprises transmitting information about a set shooting target to the second vehicle, that is the operation target vehicle after the modifying, according to the input obtained by the first controller.

8. A computer program stored in a non-transitory computer readable medium, the computer program configured to, when executed by at least one processor of a main controller of a remote controller, cause the main controller to:

perform communication connection between the main controller of the remote controller and each of one or more vehicles;

check setting information of one or more secondary controllers of the remote controller that are physically attached to the main controller; and transmit an input obtained by each of the one or more secondary controllers to a respective at least one vehicle of the one or more vehicles, by referring to the setting information of the one or more secondary controllers, wherein the setting information comprises identification information of an operation target vehicle and identification information of an operation target function of the operation target vehicle, wherein the one or more secondary controllers include a first controller and a second controller, wherein the computer program is configured to, when executed by the at least one processor of the main controller of the remote controller, cause the main controller to check the setting information by determining whether the setting information of the first controller and the setting information of the second controller indicate a same operation target vehicle and a same operation target function, and wherein the computer program is further configured to, when executed by the at least one processor of the main controller of the remote controller, cause the main controller to:

determine that the same operation target vehicle and the same operation target function are indicated; and based on determining that the same operation target vehicle and the same operation target function are indicated:

cause a display to display an interface for modifying at least one from among the setting information of the first controller and the setting information of the second controller, and modify the at least one from among the setting information of the first controller and the setting information of the second controller based on a user input.

9. A remote controller for controlling one or more vehicles that are remotely controllable, the remote controller comprising:

a main controller comprising at least one processor, the main controller configured to transmit data to and receive data from each of the one or more vehicles; and one or more secondary controllers configured to physically attach to the main controller, transmit data to and receive data from the main controller, obtain one or more inputs of a user, and transmit the one or more inputs to the main controller, wherein the main controller is further configured to check setting information of each of the one or more secondary controllers and transmit an input obtained by each of the one or more secondary controllers to a respective at least one vehicle of the one or more vehicles by referring to the checked setting information, wherein the setting information for each of the one or more secondary controllers comprises identification information of an operation target vehicle and identification information of an operation target function, wherein the one or more secondary controllers include a first controller and a second controller, wherein the main controller is further configured to determine that the setting information of the first controller and the setting information of the second controller indicate a same operation target vehicle and a same operation target function, and wherein the main controller is further configured to, based on the main controller determining that the same operation target vehicle and the same operation target function are indicated:
- display an interface for modifying at least one from among the setting information of the first controller and the setting information of the second controller, and
- modify the at least one from among the setting information of the first controller and the setting information of the second controller based on a user input.

10. The remote controller of claim 9, wherein the main controller is further configured to:
- identify, based on the setting information, the operation target vehicle of each of the one or more secondary controllers that are physically attached to the main controller, and
- identify, for each of the one or more secondary controllers and based on the setting information, the operation target function of the identified operation target vehicle of at least one of the one or more secondary controllers that are physically attached to the main controller.

11. The remote controller of claim 9, wherein the main controller is further configured to detect the one or more secondary controllers connected to the main controller, when checking the setting information.

12. A remote controller for controlling one or more vehicles that are remotely controllable, the remote controller comprising:
- a main controller comprising at least one processor, the main controller configured to transmit data to and receive data from each of the one or more vehicles; and
- one or more secondary controllers configured to physically attach to the main controller, transmit data to and receive data from the main controller, obtain one or more inputs of a user, and transmit the one or more inputs to the main controller, wherein the main controller is further configured to check setting information of each of the one or more secondary controllers and transmit an input obtained by each of the one or more secondary controllers to a respective at least one vehicle of the one or more vehicles by referring to the checked setting information, wherein the setting information for each of the one or more secondary controllers comprises identification information of an operation target vehicle and identification information of an operation target function, wherein the main controller is further configured to:
- determine that at least one from among the identification information of the operation target vehicle and the identification information of the operation target function is not assigned to a first controller of the one or more secondary controllers,
- display, based on determining that the at least one from among the identification information of the operation target vehicle and the identification information of the operation target function is not assigned to the first controller, an interface for setting, of the setting information of the first controller, the at least one from among the identification information of the operation target vehicle and the identification information of the operation target function, and
- set, based on a user input, the setting information of the first controller to include the at least one from among the identification information of the operation target vehicle and the identification information of the operation target function.

13. The remote controller of claim 9, wherein
the one or more vehicles comprise a vehicle provided with a firearm capable of shooting, and
the operation target function comprises at least one of a driving function, a shooting function, and a monitoring function.

14. The remote controller of claim 9, wherein
the main controller is further configured to:
- modify the identification information of the operation target vehicle, from a first vehicle to a second vehicle of the one or more vehicles, and the identification information of the operation target function, from a first function to a second function, and
- transmit the input obtained by the first controller to the second vehicle that is the operation target vehicle, by referring to the setting information comprising the modified identification information of the operation target vehicle.

15. The remote controller of claim 14, wherein
the first controller is configured to set a shooting function of the operation target vehicle indicated in the setting information of the first controller, and
the main controller is further configured to transmit information about a set shooting target to the second vehicle, that is the operation target vehicle after the modifying, according to the input obtained by the first controller.

16. The method of claim 1, wherein
the modifying of the setting information comprises modifying the identification information of the operation target vehicle, from a first vehicle to a second vehicle of the one or more vehicles, or modifying the identification information of the operation target function, from a first function to a second function.

* * * * *